April 27, 1943. H. SCHUCHMANN ET AL 2,317,814
COOLING TRAPS, PRIMARILY FOR CONDENSING
VAPORS OF MERCURY AND THE LIKE
Filed Oct. 6, 1939
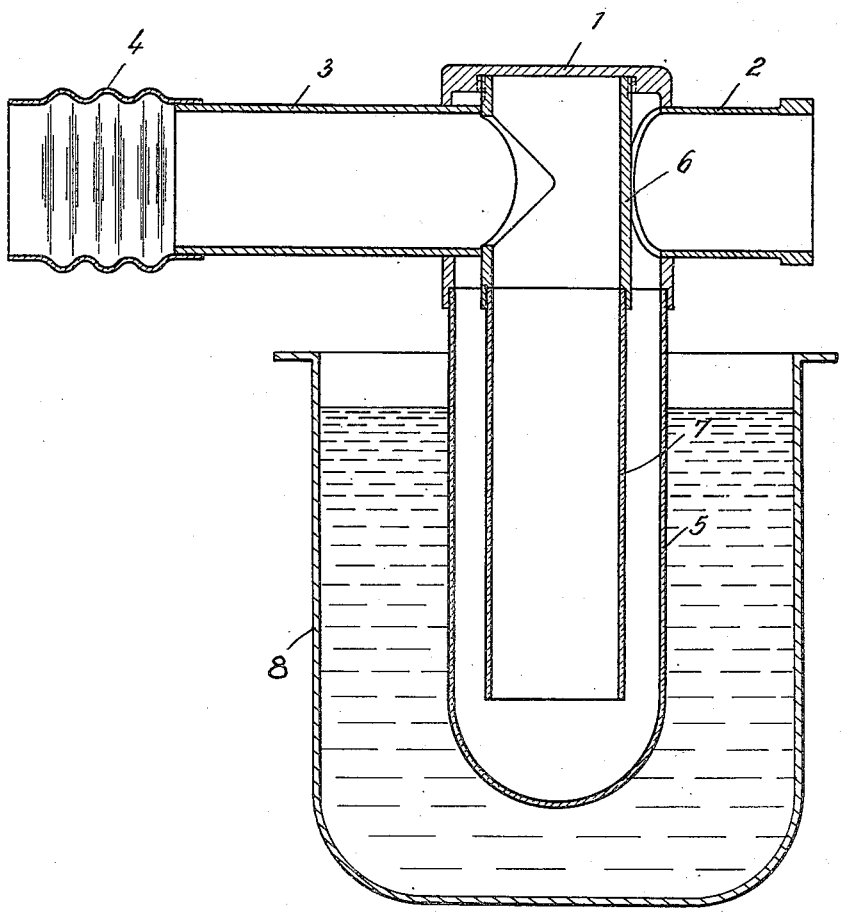
Inventors:
Hans Schuchmann
Walter Steinmetz
By: Richardson and Auer
Attys.

Patented Apr. 27, 1943

2,317,814

UNITED STATES PATENT OFFICE 2,317,814

COOLING TRAP, PRIMARILY FOR CONDENSING VAPORS OF MERCURY AND THE LIKE

Hans Schuchmann, Berlin-Spandau, and Walter Steinmetz, Berlin-Charlottenburg, Germany; vested in the Alien Property Custodian Application October 6, 1939, Serial No. 298,282
In Germany September 22, 1938

2 Claims. (Cl. 62—122)

The present invention relates to improvements in cooling traps, primarily for condensing vapors of mercury and the like.

For evacuating vessels of any kind it is known to insert a cooling trap into the suction pipe of a diffusion pump extending from such pump to the respective container to be evacuated for condensing the mercury vapors passing out of the diffusion pump. Prior to the invention, such cooling traps were generally made of glass and cooled by means of liquid air. However, certain disadvantages of such glass cooling traps have been noticed which consisted primarily in the difficulty of fusing the glass cooling trap together with the metallic connecting pipes. In some cases, especially if the pumping mechanism and the respective container were arranged on separate bases, there was considerable danger that tensional stresses occur in the glass of the cooling trap. Such tension in the glass, however, very easily causes cracks or fissures therein rendering the entire pumping mechanism useless.

It is the principal object of the present invention to overcome the mentioned disadvantages of the cooling traps previously known.

It is another object of the invention to provide a cooling trap which is to be used especially in connection with ultramicroscopes or similar metallic vacuum apparatus.

These objects are attained according to the invention by the provision of a cooling trap consisting of a metallic body having metallic connecting tubes thereon, one of which is preferably provided with a resilient element, for example, a corrugated tube of brass, tombac or the like. The cooling trap further consists of a vessel made of hard glass which is to be immersed in a cooling medium, for example, liquid air, and of a cylinder of hard glass which is mounted on a portion of the metallic body and projects into the outer vessel of hard glass.

Further objects, features and advantages of the present invention will appear from the following detailed description and the accompanying drawing showing a vertical cross section through one embodiment of the invention.

As shown in the drawing, a body portion 1 has mounted thereon tubular connecting elements 2 and 3 and an insert 6. Inasmuch as all these elements consist of metal, the cooling trap possesses high mechanical strength and is able to withstand knocking or similar stresses occurring in the operation of the respective apparatus to which the cooling trap according to the invention is connected. In order to prevent the knocking caused, for example, by the mercury when boiling in the diffusion pump, from being transmitted to the container connected to the pump, a resilient element 4 may be provided which may consist, for example of a corrugated tube of brass, tombac or the like. The metallic body portion 1 carries a bottle-shaped vessel 5 which may be secured thereto by cement or the like. The vessel 5 may be immersed in the liquid air in the container 8 for cooling the vapors which are forced by the metallic insert 6 and the cylinder 7 of hard glass which is mounted thereon, to flow along the wall of the vessel 5 before they are able to enter into the cylinder 7 and the metal tube 3.

We claim:

1. A cooling trap, comprising an inverted cup-shaped member of metal, said member having vertical cylindrical side walls and a closed end portion, a metallic insert secured to the closed end portion of said member and inside the same, said insert being spaced away from the side walls of said member to form an annular space, an inlet pipe passing through the wall of said member and communicating with said space, an outlet pipe passing through the opposite wall of said member and through the said annular space, said outlet pipe communicating with the interior of said insert through an opening in the wall thereof, a depending vessel of hard glass secured to the open end of said cup-shaped member, a cylindrical member of hard glass secured to the free end of said insert projecting into said vessel, and a liquid cooling medium in which the said depending vessel is immersed.

2. A cooling trap, comprising a vertically disposed cylindrical member of metal, a cylindrical metal insert inside said member, said insert being of substantially the same length as said member and being of smaller diameter, whereby an annular space is formed between the inner wall of said member and the outer wall of said insert, a common closure member for the upper ends of said cylindrical member and said insert, said closure member constituting also a support for the said insert to which it is secured, an inlet pipe communicating with said space through an opening in the wall of said member, an outlet pipe passing through the wall of said member and communicating with the interior of said insert through an opening in the wall thereof, a depending vessel of glass secured to the lower open end of said member, a cylindrical extension of said insert projecting into said vessel, and means for cooling said vessel.

HANS SCHUCHMANN.
WALTER STEINMETZ.